United States Patent
Clavera et al.

(10) Patent No.: US 10,277,705 B2
(45) Date of Patent: Apr. 30, 2019

(54) VIRTUAL CONTENT DELIVERY NETWORK

(71) Applicant: Hewlett Packard Enterprise Development LP, Houston, TX (US)

(72) Inventors: David Clavera, Sant Cugat del Valles (ES); Bruno D'Avanzo, Las Rozas (ES); Marie-Paule Odini, Grenoble (FR)

(73) Assignee: Hewlett Packard Enterprise Development LP, Houston, TX (US)

( * ) Notice: Subject to any disclaimer, the term of this patent is extended or adjusted under 35 U.S.C. 154(b) by 41 days.

(21) Appl. No.: 15/522,794

(22) PCT Filed: Oct. 30, 2014

(86) PCT No.: PCT/EP2014/073336
§ 371 (c)(1),
(2) Date: Apr. 28, 2017

(87) PCT Pub. No.: WO2016/066199
PCT Pub. Date: May 6, 2016

(65) Prior Publication Data
US 2017/0324828 A1    Nov. 9, 2017

(51) Int. Cl.
| | |
|---|---|
| *G06F 15/173* | (2006.01) |
| *H04L 29/08* | (2006.01) |
| *H04L 29/06* | (2006.01) |
| *H04L 12/46* | (2006.01) |

(52) U.S. Cl.
CPC ...... *H04L 67/2842* (2013.01); *H04L 12/4641* (2013.01); *H04L 67/1097* (2013.01); *H04L 67/2809* (2013.01); *H04L 67/38* (2013.01)

(58) Field of Classification Search
CPC . H04L 67/2842; H04L 67/2809; H04L 67/38; H04L 12/4641
USPC ........................................................ 709/223
See application file for complete search history.

(56) References Cited

U.S. PATENT DOCUMENTS

| | | | |
|---|---|---|---|
| 7,783,777 B1 | 8/2010 | Pablo et al. | |
| 8,417,816 B2 | 4/2013 | Esteban et al. | |
| 2014/0172944 A1 | 6/2014 | Newton | |
| 2014/0201374 A1 | 7/2014 | Ashwood-Smith et al. | |
| 2014/0229945 A1 | 8/2014 | Barkai et al. | |
| 2017/0093750 A1* | 3/2017 | McBride | H04L 47/805 |
| 2017/0214694 A1* | 7/2017 | Yan | H04L 63/20 |

(Continued)

OTHER PUBLICATIONS

Alcatel L., "Why Distribution Matters in NFV", Strategic White Paper | NFV Insights Series, Copyright 2014, 12 pages.

(Continued)

*Primary Examiner* — Kristie D Shingles
(74) *Attorney, Agent, or Firm* — EIP Europe LLP

(57) ABSTRACT

Examples of methods and a system for implementing a virtual content delivery network are described. In one example, a content delivery network manager controls the instantiation of definition data representing the virtual content delivery network. The definition data includes object definitions for a plurality of virtualization containers. The plurality of virtualization containers includes a control plane container, a region container and one or more end point containers. The object definitions are instantiated and a network coupling configured to effect the virtual content delivery network.

20 Claims, 5 Drawing Sheets

(56) References Cited

U.S. PATENT DOCUMENTS

2018/0041578 A1\* 2/2018 Lee ......................... H04L 47/70
2018/0131580 A1\* 5/2018 Tomkins ............. H04L 41/5009

OTHER PUBLICATIONS

Mukhtar, R. "A Client Side Measure Scheme for Request Routing in Virtual Open Content Delivery Networks", The University of Melbourne Victoria 3010, Australia. 2003 IEEE 8 pages.
Unknown, "Network Functions Virtualisation (NFV); Use Cases", Group Specification, ETSI, GS NFV 001 V1,1.1, Oct. 2013, 50 pages.
Unknown, "Network Functions Virtualization; End-to-End Architecture",Group Specification, ETSI, GS MFV-0010, V0.1,6, Aug. 2013, 23 pages.
International Searching Authority, "Notification of Transmittal of the International Search report and the Written Opinion", PCT/EP2014/073336, dated Jan. 28, 2015, 12 pages.

\* cited by examiner

VIRTUAL CONTENT DELIVERY NETWORK

BACKGROUND

Content delivery networks are large distributed networks found across the internet which serve content to end-users, guaranteeing high availability and performance. Content delivery networks may be used to supply one or more media content, downloadable data and network applications. Media content may be static or may be streamed and may comprise items such as text, graphics, audio and video content. Downloadable data may comprise software and document downloads or data from large network-hosted datasets. When implementing network services such as content delivery networks, communication service providers face a number of challenges. A first challenge is the number of different proprietary solutions used to implement modern communication networks. This results in an inflexibility that needs to be balanced with an ability to cope with ever increasing network traffic and demand. A second challenge is lack of scalability and the time that is required to enhance network features. For example, over a large distributed network modifications can take months or years to implement.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein:

FIG. 3B is a schematic diagram showing an exemplary CDN virtual network function for a CDN local component;

DETAILED DESCRIPTION

Figure 1:
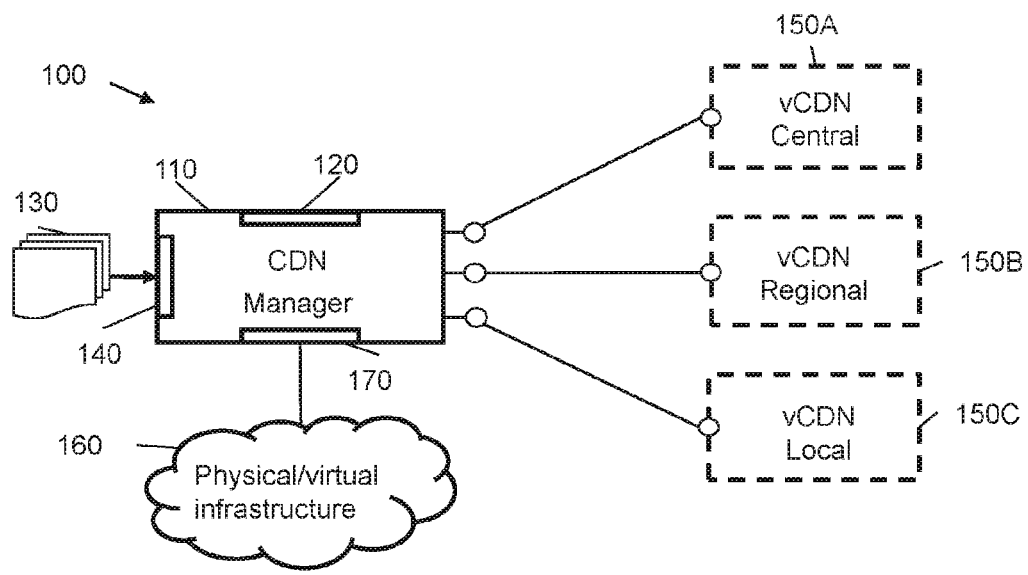
FIG. 1 is a schematic diagram showing a system for provisioning a virtual CDN according to an example.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Content delivery networks (CDN) provide means for distributing content over a large distributed network of users. They provide high availability and high performance. On-demand streaming media, applications and social networks are examples of content which may be distributed over CDN's.

According to one approach a CDN is built form a number of layers relying on local caching of content to provide high availability. This content may be content that is particularly in demand. In one example, a CDN is built from a network of dedicated servers at a centralized location, regional locations and local locations. Alternatively a hybrid approach may be deployed combining traditional CDN with peer-to-peer networking. These approaches ensure that even when there is a spike in demand for content, the CDN only need sufficiently wide coverage at each level of the network to guarantee availability of the content. The most popular content may be copied and cached across multiple local servers to guarantee fast access for over-the-top traffic, while less popular, less frequently accessed content may be stored in less accessible areas of the network.

A problem for service providers implementing CDN's is scaling. In particular, upgrading a tiered network comprising central, regional and local distribution requires months of planning to deploy new end points, reconfigure the network and update management infrastructure. Similarly, adding new features to a CDN can be costly and time consuming. Moreover maintaining a large distribution of hundreds or thousands of servers across a wide geographical distribution is complex and expensive. With a huge increase in demand for streaming content over 3G, 4G and Wi-Fi networks, a more flexible solution than that currently in place is desirable.

Many comparative CDN configurations provide end-point devices, e.g. packaged server computing devices that have a predefined capacity. As such capacity needs to be monitored and content is typically deleted when the end-point device is near to full capacity. At this point no more files may be downloaded until existing content has been deleted. This may introduce some delays. Plus this content may need to be re-uploaded to cope with new demand at a later point in time.

A successful approach to addressing scaling is virtualization. Network function virtualization is a concept that approaches networks from a purely virtual point of view, applying conventional virtualization techniques to networking. Certain methods and systems described herein enable a CDN to be provisioned through network function virtualization using "object definition data" to define different aspects of the CDN in terms of network functions. Object definition data define "virtualization containers" which comprise definitions of network functions and sub-functions necessary to implement a content delivery network in a virtual environment. In particular, it is possible to implement functions of a desired CDN across a virtual network by implementing this object definition data. In certain examples described herein a CDN may be rapidly implemented and scaled by deploying appropriate instances of "central", "regional" and "local" virtualized containers. It is possible to add, remove or modify the object definition data related to these containers and their sub-components so as to effect the desired functionality of a CDN, however in a virtualized environment, with the result being that the CDN can be scaled more readily than a comparative non-virtualized CDN.

FIG. 1 is a simplified schematic diagram of an apparatus 100 for provisioning a virtual CDN according to an example. The apparatus 100 comprises a CDN manager 110 with a command interface 120. The command interface 120 is arranged to receive a command to effect a virtual CDN. The CDN manager 110 is further arranged to receive CDN definition data 130 at a data interface 140. The CDN definition data 130 is representative of a virtual CDN (vCDN). According to an example, CDN definition data 130 contains object definition data defining one or more objects that are representative of a plurality of components of a CDN. In one example, object definition data comprises definitions for virtualization containers. In FIG. 1, three separate virtualization containers 150 are shown. These include a vCDN central container 150A, a vCDN regional container 150B and vCDN local container 150C. These are illustrative of virtualization containers which may be used in conjunction with CDN manager 110, however further definition data for virtualization containers may be included in object definition data 130 and additional hierarchical levels of a CDN may be included in other examples. According to one example, CDN manager 110 is a virtualized management system that may be operated on an existing virtual network. In certain cases CDN manager 110 is deployed by the entity provisioning the virtual CDN; in other cases CDN manager 110 may be separately deployed, e.g. by a third party. The CDN manager is arranged to access the command from the command interface 120 and to retrieve CDN definition data 130 via the data interface to effect the virtual CDN.

According to an example, CDN manager 110 may be executed on a physical/virtual infrastructure 160. The physical/virtual infrastructure may be distributed over a variety of geographical locations, e.g. one or more data centers, and/or may be provided locally or centrally at the location of the party provisioning the vCDN. In one case physical/virtual infrastructure 160 is provided externally to the users operating the CDN manager 110, for example through one or more cloud-infrastructure providers. In further cases hybrid approaches may be used, such as peer-to-peer networking and cloud-based networking.

The CDN manager 110 is coupled with the physical/virtual infrastructure 160 via a control interface 170. In use, the CDN manager 110 may be arranged to receive instruction to provision a vCDN via the command interface 120. The CDN manager 110 is arranged to use CDN definition data 130 to provision the vCDN. CDN manager 110 may pass one or more instructions to one or more components of the physical/virtual infrastructure 160 via control interface 170 to provision a new vCDN based on the CDN definition data 130. The physical/virtual infrastructure 160 is arranged to control the instantiation and network coupling of the object definitions based on instructions from the CDN manager 110 that are received via the control interface 170, such that physical resources are deployed to effect the virtual CDN in response to an initial command or request. In one example the physical/virtual infrastructure 160 comprises one or more computing devices implementing one or more physical and/or virtual machine servers that are arranged to implement virtual network functions through network function virtualization. Network topology or coupling changes may comprise changes to one or more virtual networks, such as virtual local area network, vLANs, and/or virtual wide area network vWANs. Network topology or coupling changes may also comprise configuring the connectivity of one or more virtual network function components such as virtual switches and/or network interfaces and links.

The CDN manager 110 may send any one of a number of separate instructions via the control interface 160 to the physical/virtual infrastructure 160 dependent upon an input received at command interface 120 and/or the result of processing the CDN definition data 130. Examples of instructions may include a request to provision a new node on an existing vCDN or a modification of the virtual network topology of an existing vCDN. CDN manager 110 is also arranged to receive requests and/or data from the physical/virtual infrastructure 160, for example error handling messages and network outages, software and hardware upgrade information and performance data. These requests and/or data may be received via the control interface 170. In one example, CDN manger 110 is arranged to receive continuous and/or periodic status updates from the physical/virtual infrastructure 160 which may be fed back to a user computing device, e.g. via command interface 120 and/or one or more notification systems. CDN manager 110 may send further instructions continuously and/or periodically to the physical/virtual infrastructure 160 in response to status updates, such as provisioning new nodes, or modifying network topology. In one case, such modifications may be made to maintain and/or optimize performance of the vCDN. In other cases it may be necessary to make a modification to the vCDN architecture in response to changes in the physical/virtual infrastructure itself.

Figure 2:
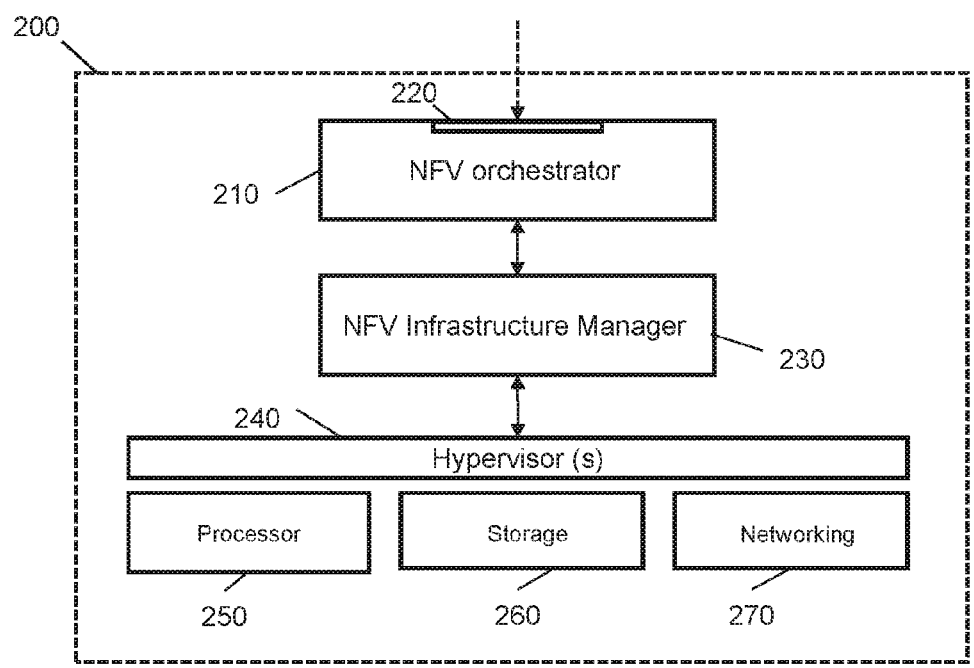
FIG. 2 is a schematic diagram showing a physical/virtual infrastructure according to an example.

FIG. 2 is a schematic diagram showing a set of components of a physical/virtual infrastructure 200 that may be used to execute a virtual/physical infrastructure 160 as shown in FIG. 1 according to an example. In particular, FIG. 2 shows an example of physical/virtual infrastructure 200 which may be interfaced with the CDN manager 110 shown in FIG. 1. The physical/virtual infrastructure 200 comprises a network function virtualization (NFV) orchestrator 210 that comprises a control interface 220 for accessing instructions from a CDN manager such as the CDN manager 110 shown in FIG. 1. NFV orchestrator 210 may be implemented as computer program code that is processed by a server computing device comprising one or more processors and memory. The NFV orchestrator 210 may itself comprise a virtual machine in a virtual environment. The NFV orchestrator 210 is arranged to implement instances of object definitions, for example network functions and/or network function components, that are associated with each virtualization container 150 based on instructions received from the CDN manager 110. The NFV orchestrator 210 may maintain a mapping between virtual network resources in a virtual environment and physical computing resources. An instruction received at the NFV orchestrator 210 via control interface 220 to instantiate a vCDN according to object definition data comprises an instruction to allocate physical resources to execute a plurality of virtual network functions in accordance with the object definition data. When a new CDN virtual network function needs to be deployed, instructions received at the control interface 220 are passed to the NFV orchestrator 210 for action.

In FIG. 2, NFV orchestrator 210 is communicatively coupled to an NFV infrastructure manager 230. Instructions received at control interface 220 may be used by NFV orchestrator 210 to generate one or more commands to issue to NFV infrastructure manager 230 to allocate physical resources to effect the vCDN. In one case instructions sent from NFV infrastructure manager 230 are parsed by one or more hypervisors 240 and may comprise instructions to provision hardware resources to instantiate the vCDN across a virtual network. FIG. 2 shows three separate set of physical resources that may implement the vCDN. These physical resources comprising processor resources 250, storage resources 260 and networking resources 270. Processor resources 250 may comprise one or more processing units, e.g. one or more cores and/or central processing units of one or more computing devices. Storage resources 260 may comprise memory and/or data storage resources such as flash memory and hard disks. Networking resources 270 may comprise network equipment and/or interfaces. In one case, the resources may be implemented as two layers: a first layer of virtual processor, storage and networking resources and a second layer of corresponding physical resources. In one case, a mixture of virtual and physical resources may be used to implement the vCDN. In one example, the NFV infrastructure manager 230 may request virtual and/or physical resources on a server computing device that may be used to implement one or more virtual machines. One or more hypervisor(s) 240 manage the operation of one or more virtual machines utilizing physical resources 250-270. Hypervisor(s) 240 are software management utilities providing a virtualization layer on a physical layer. NFV infrastructure manager 230 may be implemented as a layer of network function virtualization between NFV orchestrator 210 and hypervisor(s) 240, however other possibilities where NFV infrastructure manager 230 is incorporated in to a NFV orchestrator 210 are possible.

According to an example, object definition data 130 as shown in FIG. 1, defines virtualization containers 150 which comprise a plurality of network functions virtualization definitions for effecting a virtual CDN. Once physical resources 250-270 have been allocated, NFV infrastructure manager 230 may instruct a network coupling to effect the plurality of network function virtualization definitions and execute the virtualization containers according to an object definition data, such as object definition data 130. This then enables data to flow through the virtual network as defined in the object definition data 130.

According to an example, NFV orchestrator 210 is further arranged to receive data from the NFV infrastructure manager 230, indicative of the state of the physical resources assigned to effect the vCDN. In one example, the NFV orchestrator 210 may issue one or more communications to a control interface of a CDN manager such as control interface 170 of CDN manager 110 shown in FIG. 1. In other cases another dedicated interface may be used. The NFV orchestrator 210 may issue one or more communications in response to a message received from the NFV infrastructure manager 230. Examples of communications include communications issued in response to changes in the physical resources supporting the vCDN. For example, a faulty node in the physical network resources 270 or changes in processing resources 250 or storage resources 260 may require instruction to be issued from NFV infrastructure manager 230 to the NFV orchestrator 210, and for the NFV orchestrator 210 to communicate with the CDN manager 110. In certain cases the NFV orchestrator 210 may issue recommendations and/or provide options for changes to an implemented CDN that may be confirmed via the CDN manager 110.

In FIG. 2, NFV orchestrator 210, NFV infrastructure manager 230, hypervisor(s) 240 and physical resources 250-270 are shown as part of the same physical/virtual infrastructure 200, however numerous differing infrastructures are possible. In one case, NFV orchestrator 210 may be managed and supplied as part of a centralized architecture with a CDN manager 110 such as that shown in FIG. 1 or altogether separately from an existing physical/virtual infrastructure and a CDN manager. Similarly the NFV infrastructure manager 230, hypervisor 240 and physical resources 250-270 may be supplied together or separately by separate vendors and/or network providers from both the NFV orchestrator and CDN manager.

Figure 3A:
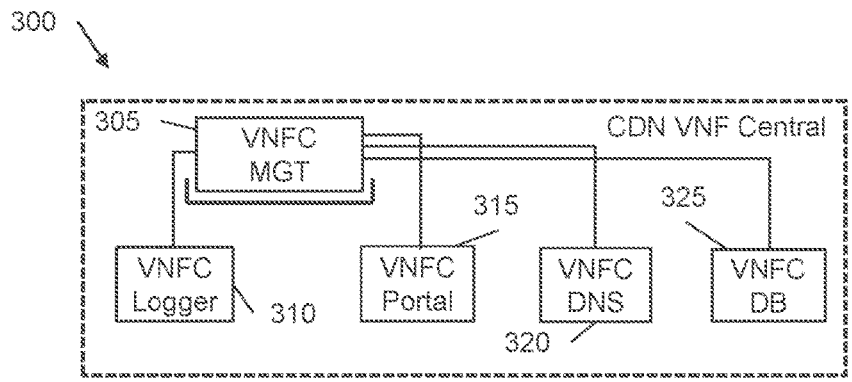
FIG. 3A is a schematic diagram showing an exemplary CDN virtual network function for a CDN central component.
Figure 3B:
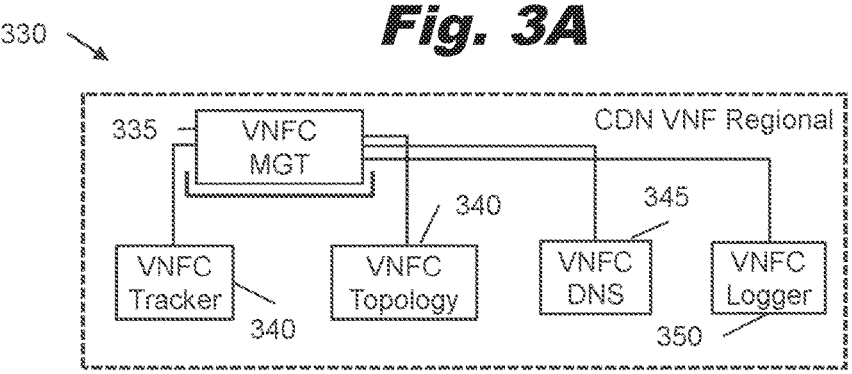
FIG. 3B is a schematic diagram showing an exemplary CDN virtual network function for a CDN regional component.
Figure 3C:
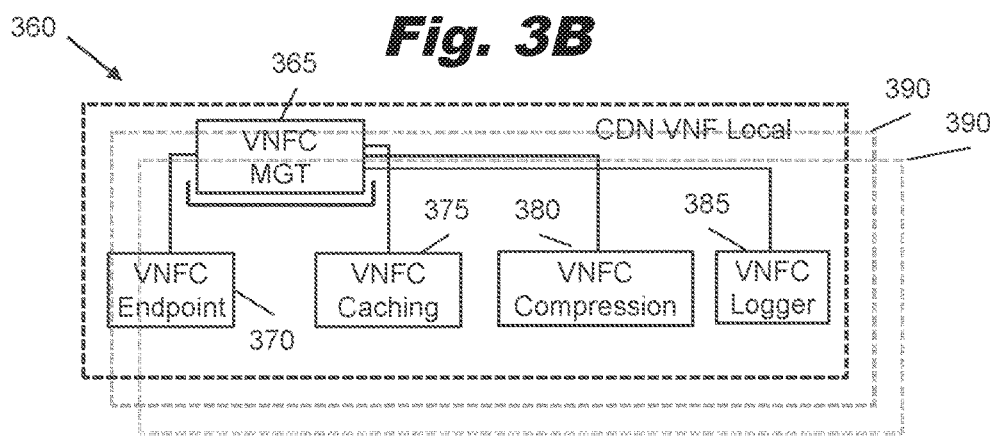

FIGS. 3A, 3B and 3C show three separate examples of vCDN virtual containers, each container representative of a different layer of a CDN which may be implemented on the systems shown in FIGS. 1 and 2. Virtualization containers 300, 330 and 360 may be coupled virtually via instructions issued by the CDN manager. Each virtualization container in FIGS. 3A, 3B and 3C comprises one of a plurality of separate components required to implement a central, regional or local CDN layer corresponding to virtualization containers 150 shown in FIG. 1.

FIG. 3A shows an example of virtual network function (VNF) central, or control plane, virtualization container 300 that may implement the vCDN central container 150A in FIG. 1. The central virtualization container 300 comprises a VNF management component 305 arranged to instruct and manage a VNF Logger component 310, VNF portal component 315, VNF domain name server (DNS) component 320 and a VNF database component 325. These are illustrative of VNF components that may be used to implement an example control plane in a CDN: additional and/or different VNF components are possible in other examples. The VNF management component 305 is arranged to instruct central control of the vCDN based on instructions from a CDN manager such as CDN manager 110 shown in FIG. 1. VNF Logger component 310 is a virtual network sub-function used to maintain a log of activity of the one or more virtual components implementing the VNF central virtualization container 300. CDN VNF portal component 315 is a virtual network function corresponding to network administrative tasks such a scheduling, access control, user information etc. VNF DNS component 320 is an example of a virtual network function implementing a domain name server mapping domain names to (virtual) IP addresses across vCDN central container 300. VNF DB component 325 is a database component which may be used for any number of database applications associated with the control plane.

FIG. 3B shows an example of VNF regional service virtualization container 330 which may be used to implement a regional layer of a CDN in a virtual network environment. The VNF regional service virtualization container 330 may be used to implement vCDN region contained 150B in FIG. 1. The VNF regional service virtualization container 330 comprises a VNF management component 335 arranged to instruct a VNF tracker component 340, VNF network topology component 345, VNF DNS component 350 and a VNF logger component 355. As in FIG. 3A, VNF DNS component 350 is used for implementing a DNS across the vCDN regional service container and VNF logger component 355 is used to maintain a log of activity across the same container. VNF tracker component 340 may be used to monitor bandwidth through the virtual network, as well as to monitor virtual switching ports in the network and changes in virtual network nodes. VNF network topology component 345 is an example of a virtual network function that maintains a map of a virtual network. In this case, the VNF network topology component 345 is shown in the regional layer of the vCDN; however it is possible that a topology component could be found in other layers.

FIG. 3O shows an example of VNF local or end-point virtualization container 360. The local virtualization container 360 may implement vCDN local container 150C in FIG. 1. VNF local virtualization container 360 defines a CDN endpoint and/or entry point virtual nodes to which clients may connect to the vCDN to send and receive content. Container 360 comprises a VNF management component 365 arranged to instruct a VNF endpoint component 370, VNF caching component 375, VNF compression component 380 and a VNF logger component 385. VNF endpoint component 370 is representative of one or more endpoint nodes where content may be delivered from, or uploaded to, the vCDN. There may be plurality of endpoint nodes that are instantiated based on the VNF end point component 370. Object definition data for the container 360 may also specify how multiple endpoint nodes are to be configured. Multiple endpoint nodes may be implemented from a common definition of a VNF end point component 370. The VNF end point component 370 is controlled by VNF management component 365 and is responsive to instruction to introduce a new endpoint node into the vCDN or remove an endpoint in response to a command from elsewhere in the vCDN. VNF caching component 375 contains one or more cached copies of content accessible through the vCDN and is communicatively coupled to the endpoint component to allow endpoint users to access content. VNF compression component 370 may be used for compressing or uncompressing cached content in the caching component in response to requests from elsewhere in the vCDN. Logger component 385 stores and updates a log of activity in the local virtualization container.

CDN VNF local server virtualization container in FIG. 3 is shown as a plurality of separate virtualization container instances 390 representative of plurality of endpoint fulfillment requirements of the vCDN. In particular, as in conventional CDN, multiple copies of local virtualization containers may exist to facilitate endpoint fulfillment requirements. The number of such copies is specified by a request to provision a vCDN according to object data.

In one example, as well as executing file distribution through a hierarchical structure as exemplified in the CDN virtualization containers shown in FIGS. 3A-3C, it is possible for a CDN manager such as that shown in FIG. 1 to instruct for, and execute, a network where the virtual endpoint nodes correspond to nodes of a peer-to-peer network. For example, the object definition data may define peer-to-peer connectivity between instances of end-point containers. Typically instead of having to distribute content from the central repository to an end point, content can move from one end point to another. This is peer to peer. In this case, file distribution through the CDN may be based on exchange between endpoint nodes of the network, if the content needed in one location is already available in a given end point. In this case, a particularly advantageous feature is that the closest virtual peer node with the same content in the virtual network may be located in a common set of physical resources, e.g. in a common server computing device. Hence a virtual network switch may be set up between such nodes taking advantage of virtual machine-to-virtual machine location. Peer to peer communication between end points, even if not collocated on the same physical resource, also avoids significant "vertical" data transfers, e.g. from central repository to end points. Instead data transfer is more "horizontal", i.e. occurs at the edge of the network between closest end points that have the content needed.

For example, a request for content may be received at a first instance of an end point container. In response, it may be determined, e.g. at the first instance, whether the content is available within this first instance, e.g. is located on coupled physical and/or virtual storage. If content is not available at this first instance, a second instance of an end point container that has access to the content is located. In certain cases this second instance is selected to be a "closest" peer, e.g. within a set communication distance and/or on a common physical machine. If the second instance has access to the content it is communicated from the second instance to the first instance to fulfill the request at the first instance.

According to an example, when more capacity is needed in a particular region, the CDN manager 110 may instruct additional endpoint fulfillment based on the local virtualization container 360. The CDN manager 110 may monitor the capacity directly or may instruct one or more components of the physical/virtual infrastructure to perform this. For example, another instance of the container may be generated by the CDN manager 110 and then implemented via instructions to an NFV orchestrator 210 as described above. The CDN manager 110 then computes and instructs the necessary topology changes required for the instances of the regional and central virtualization containers such that the new node is integrated into the vCDN. Alternatively a CDN manager can instruct the NFV orchestrator to disable one or more nodes when demand is low and effect the corresponding changes through the virtual network.

A vCDN system as described in the examples above enables functionality such as automatic endpoint detection, centralized activity tracking, automatic provisioning of nodes, fault management, automatic failover and network reconfiguration functions. This provides an automated adaptive vCDN system.

Figure 4:
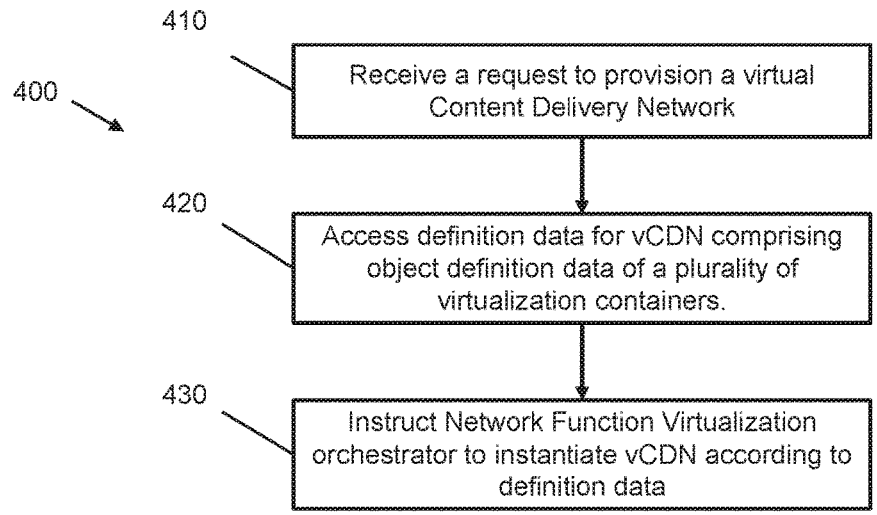
FIG. 4 is a flow diagram showing a method for provisioning a virtual CDN according to an example.

FIG. 4 shows a method 400 for provisioning a virtual CDN according to an example. This method may be implemented on, for example, the systems and apparatus shown in FIGS. 1 and/or 2. At block 410 a request is received to provision a CDN. According to an example, the request may be made by a client device operated by a user and/or may be received through an interface such as command interface 120 shown in the example of FIG. 1. In one case, a command that is received at the command interface 120 may be generated programmatically, e.g. based on an automated system or via an operations support system (OSS) in a telecommunications network. In one case the command is an instruction to provision a vCDN according to an object definition data. A request to provision a CDN may be converted into a command to implement a vCDN.

At block 420 definition data, in the form of object definition data for a plurality of virtualization containers is accessed. In one case the object definition data may be accessed through a data interface to a CDN manager as shown in FIG. 1; in other cases the object definition data may be available to the device implementing the method. Some or all of the object definition data may be accessed from storage after receiving a request at a command interface to provision the vCDN. In another case, object definition data may be complemented by parameter values required to meet a specification of a requested CDN. For example, one or more values may be received together with the command to provision the vCDN. The object definition data may comprise definition data for a plurality of virtualization containers, such as those shown in FIGS. 3A, 3B and 3C corresponding to central, regional and local containers, together with a definition of a network topology defining the interconnects between the different virtualization containers and/or sub-components of the containers. At block 430 a network function virtualization orchestrator is instructed to instantiate the vCDN according to the definition data. This may comprise instantiating particular sub-components as defined in the definition data together with parameter values gathered by a CDN manager. This may be performed in association with an NFV orchestrator 210 in a physical/virtual infrastructure 200 as shown in FIG. 2. In this case, the NFV orchestrator 210 may receive one or more instructions to instantiate virtual network functions and/or virtual network function components of the vCDN according to the definition data. A more detailed method of instantiating a vCDN according to definition data is shown in FIG. 5.

Figure 5:
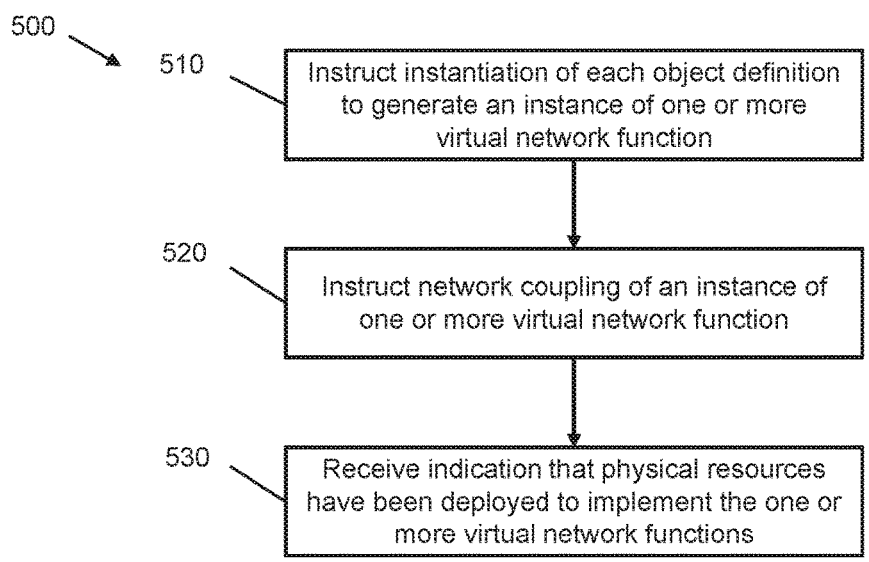
FIG. 5 is a flow diagram showing a method for instructing a Network Function Virtualization orchestrator to instantiate a virtual CDN according to an example.

FIG. 5 shows a method 500, according to an example, of instantiating a vCDN. This method may also be applied with the apparatus shown in FIGS. 1 and 2, in particular through the interfacing of a CDN manager 110, as shown in FIG. 1, and a NFV orchestrator 210, as shown in FIG. 2. At block 510 instructions to instantiate object definition data to generate instances of one or more virtual network functions are generated. These may be generated by the CDN manager 110 of FIG. 1 and sent to the physical/virtual infrastructure 160. For example, these instructions may be received at a control interface 220 of an NFV orchestrator 210 as shown in FIG. 2. At block 520 a network coupling of instances of the one or more virtual network functions, and/or virtual network function components, are instructed. Block 520 may in turn comprise instructing a configuration of physical resources 250 to 270, e.g. via NFV infrastructure manager 210 as shown in FIG. 2. At block 530 indication that physical resources have been deployed to implement the one or more virtual network functions is received, e.g. by the CDN manager 110. In one case, indication is received at a NFV orchestrator 220, which can instruct a CDN manager 110 that a vCDN has been provisioned according to the instructions received that are based on the object definition data. In another case, indication is provided directly to the provisioner of the vCDN.

Figure 6:
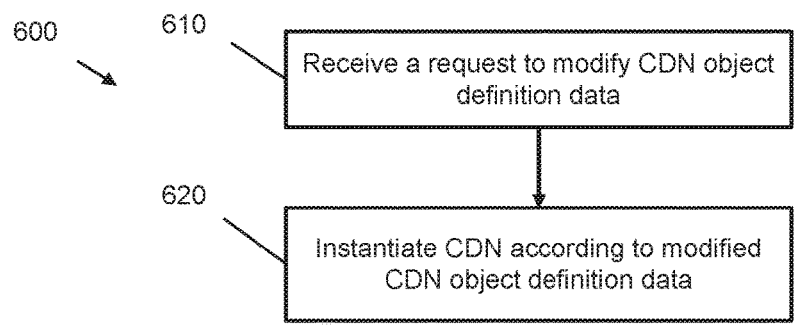
FIG. 6 is a flow diagram showing a method for modifying an instance of a virtual CDN according to an example.

FIG. 6 shows a method 600 for modifying an instance of a vCDN. The method 600 shown in FIG. 6 may be implemented on the apparatus shown in FIGS. 1 and 2 and can also be used in conjunction with methods 400 and 500 shown in FIGS. 5 and 6 to modify a vCDN that has previously been instantiated on instruction of the CDN manager. At block 610 a command is received that is indicative of an instructed modification of a vCDN. For example, the command may be received via command interface 120. In this example, the command relates to a desired modification of an existing vCDN instance. Alternatively a modification may be requested in response to communications received from the physical/virtual infrastructure 160 and/or based on ongoing processing by the CDN manager 110. For example, it may be the case that due to network outages or faulty nodes in the physical network, changes in physical network topology, upgrades in software running on physical components or increased or decreased bandwidth on the physical network the vCDN instance needs to be modified to maintain the same functionality. In this example, the command relates to a request to provision an instance of another local virtualization container such as 150C or 360. This may be required to scale the network at times of high load or demand. It should be noted that a large vCDN may have hundreds of instances of a local virtualization container to implement a plurality of end-point nodes. However, in other cases the command may relate to other modifications, for example may be received when a user at a vCDN endpoint node requests say additional storage capacity to upload media onto the vCDN.

If the command at block 610 is received from an entity external to the CDN manager it may be parsed and executed by a CDN manager 110. If the command relates to the provision of an end-point, this may comprise accessing data defining an end-point virtualization container of the vCDN. In this case the end-point virtualization container is associated with definition data for a plurality of virtual network sub-components. At block 620 instructions are sent to NFV orchestrator to instantiate the end-point virtualization container. This may comprise generating a new instance based on the end-point virtualization container or duplicating an existing instance. The instantiation of the end-point virtualization container comprises implementing instances of the sub-components of the container, e.g. one or more virtual network functions and virtual network function components. Again this may comprise generating new instances and/or copying existing instances. In the former case instances are generated based on parameter values associated with the request or with data accessible to the CDN manager. In the latter case parameter values of existing instances may be modified to provision the desired end-point.

The block 620 of instructing instantiation of a local virtualization container may comprise a number of sub-blocks. Firstly, a state of an instance of the vCDN to be modified may be determined. This may include determining a state of one or more instantiated virtual network sub-components of the vCDN, said sub-components being associated with one of a control plane virtualization container and a regional virtualization container. Determining a state may comprise locating one or more instances of the required components. Once the states of these instances are known a CDN manager may instruct instantiation of the end-point virtualization container, including instructing instantiation of one or more of the plurality of virtual network sub-components of the end-point virtualization container. This may comprise instructing network coupling of instances of the virtual network sub-components of the end-point virtualization container to instances of the virtual network sub-components of the vCDN, e.g. by instructing network topology or coupling changes as described above. Once these instructions have been sent the CDN manager may wait for an indication that physical resources have been configured to effect the modification of the vCDN.

Figure 7:
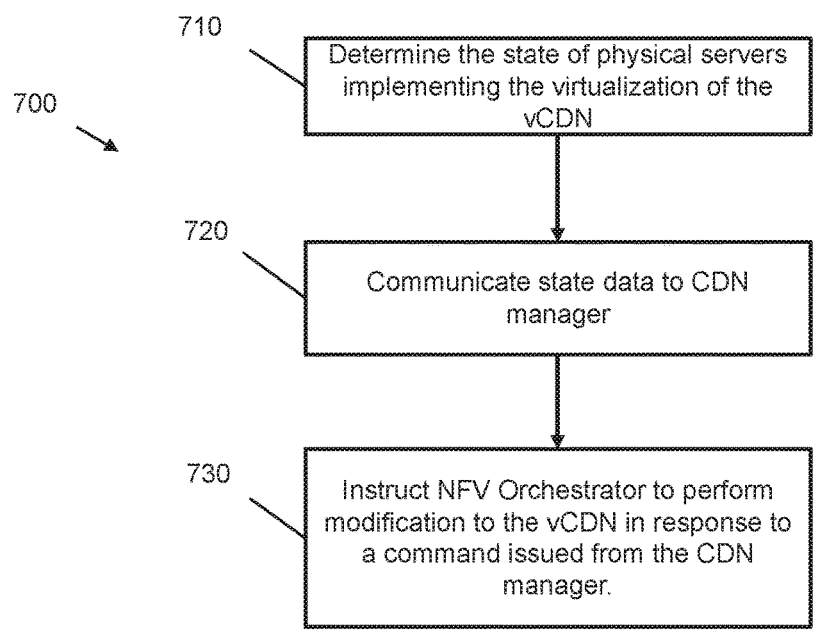
FIG. 7 is a flow diagram showing a method of monitoring a state of a virtual CDN according to an example.

FIG. 7 shows a method 700, according to an example, of monitoring the state of a vCDN. This example further relates to instructing a NFV orchestrator to modify one or more aspects of a vCDN in response to a change in the state of the vCDN. This may be a change in the state of one or more virtual and physical resources that are implementing the vCDN. At block 710, the state of the vCDN is recorded. This may be performed by the NFV orchestrator 210 in FIG. 2. In one case a determination of state data is made periodically by one or more hypervisors 240 and this is communicated to the NFV orchestrator. In another case, data may be received from a NFV infrastructure manager such as in FIG. 2. At block 720 the state data is communicated to a CDN manager, such as CDN manager 110. In one case communications may be sent by the NFV orchestrator; in other cases, the CDN manager may receive communications directly from one or more components of the physical/virtual infrastructure. At block 730 an NFV orchestrator is instructed to perform a modification of the vCDN in response to a command issued from the CDN manager. The CDN manager may instruct one or more automatic provisioning of new nodes, network topology changes and fault management in response to receiving state data on a faulty node. In another case, the CDN manager may issue a message to any of the levels of the vCDN itself. For example a message may be issued to an endpoint node to inform a user of scheduled maintenance tasks.

Virtualizing a CDN in the manner described in the examples has an advantage of scalability and of forming a network that is highly dynamic. Moreover virtualization of CDN's allows content delivery without dedicated CDN hardware resources. This allows existing CDN providers to more readily upgrade their CDN resources and increases availability of CDN functionality to parties that do not have access to dedicated hardware devices. Furthermore it allows the decoupling of hardware from software resources and the leveraging of existing resources if extra capacity is needed in the network. A virtual CDN as described herein allows also the mutualization of resources between different CDN networks (e.g. Video on Demand and IPTV) and different CDN providers, e.g. allows providers to share physical resources but have independent virtual resources. This then reduces the need for proprietary networks and allows smaller operators to afford and expand CDN capabilities. A CDN manager provides an advantageous way of managing virtualization containers to implement a hierarchical vCDN. Components of the vCDN from the virtualization containers down to the individual nodes and end points can be individually managed. The provisioning of a vCDN as described herein may enable CDN functionality to be easily dynamically scaled, e.g. for a live sports event in response to a large demand. For example, this may comprise provisioning a plurality of additional end-point instances. As these may be implemented on shared servers, advantage may be taken of low demand in other vCDN implementations on the same server.

Figure 8:
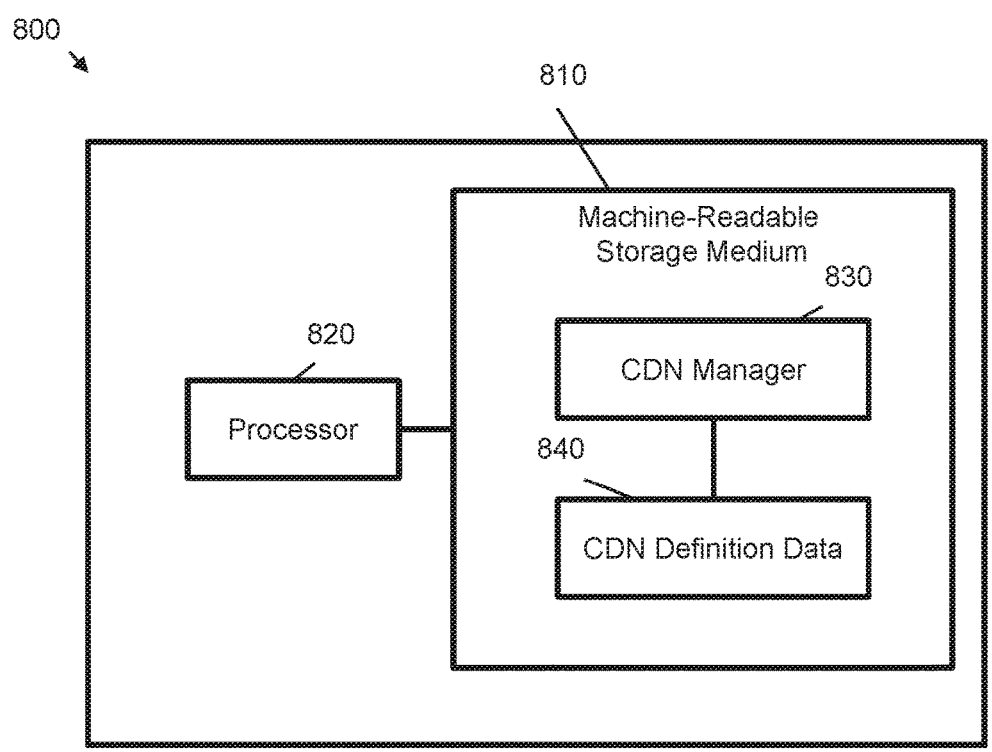
FIG. 8 is a schematic diagram showing an exemplary computer system.

Certain methods and systems as described herein may be implemented by a processor that processes program code that is retrieved from a non-transitory storage medium. FIG. 8 shows an example 800 of a device comprising a machine-readable storage medium 810 coupled to a processor 820. Machine-readable media 810 can be any media that can contain, store, or maintain programs and data for use by or in connection with an instruction execution system. Machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc. In FIG. 8, the machine-readable storage medium comprises program code to effect 840 to effect a CDN manager 830 and CDN definition data 840 as described in the foregoing examples herein.

Similarly, it should be understood that the CDN manager 830 may in practice be alternatively provided by a single chip or integrated circuit or plural chips or integrated circuits, optionally provided as a chipset, an application-specific integrated circuit (ASIC), field-programmable gate array (FPGA), etc. The chip or chips may comprise circuitry (as well as possibly firmware) for embodying at least a CDN manager as described above, which are configurable so as to operate in accordance with the described examples. In this regard, the described examples may be implemented at least in part by computer program code stored in (non-transitory) memory and executable by the processor, or by hardware, or by a combination of tangibly stored code and hardware (and tangibly stored firmware).

The preceding description has been presented to illustrate and describe examples of the principles described. This description is not intended to be exhaustive or to limit these principles to any precise form disclosed. Many modifications and variations are possible in light of the above teaching.

What is claimed is:

1. A method comprising:
receiving a request to provision a virtual content delivery network (CDN);
accessing definition data for the virtual CDN, the definition data comprising object definitions for a plurality of virtualization containers, the plurality of virtualization containers comprising a control plane container to implement a control plane for the virtual CDN, a region container to implement a virtual CDN region, and one or more end point containers to implement a virtual CDN local container, each virtualization container comprising a virtual network function with a plurality of virtual network function components,
instructing a network function virtualization (NFV) orchestrator to instantiate the virtual CDN according to the definition data, including:
instructing instantiation of each of the object definitions to generate instances of one or more virtual network functions;
instructing network coupling of the instances of the one or more virtual network functions; and
receiving indication that physical resources have been deployed to implement the instances of the one or more virtual network functions.

2. The method of claim 1, comprising implementing the virtualization of the CDN on a physical network by assigning one or more physical servers to implement the mapping between the virtual and physical networks.

3. The method of claim 1, comprising:
receiving a request for content at a first instance of an end point container;
determining whether the content is available at the first instance; and
responsive to content not being available at the first instance,
determining a second instance of an end point container that has access to the content; and
communicating the content from the second instance to the first instance to fulfil the request.

4. The method of claim 1, comprising:
receiving a further request to modify the virtual CDN; and
instructing modification of the instances associated with one or more of the object definitions.

5. The method of claim 4, wherein instructing modification of the instances comprises one or more of:
adding an additional instance of an end point container; and
removing an existing instance of an end point container.

6. The method of claim 1, comprising:
monitoring a state of the virtual CDN; and
instructing a modification to the instances associated with one or more of the object definitions when a predefined change in state is detected.

7. The method of claim 1 wherein the plurality of virtual network function components comprise one or more of a management component, a logging component, a storage component and a topology component.

8. A system for implementing a content delivery network (CDN) comprising:
a command interface arranged to receive a command to affect a virtual CDN;
a data interface arranged to receive definition data representative of a virtual CDN;
a control interface arranged to send one or more commands to an NFV orchestrator, the commands comprising instructions to control instantiation of at least one or more virtual network function components; and
a CDN manager arranged to access the command from the command interface, retrieve definition data via the data interface to effect the virtual CDN, and instruct the NFV orchestrator via the control interface based on the definition data;

wherein the definition data comprises object definitions for a plurality of virtualization containers;

wherein the plurality of virtualization containers comprising a control plane container to implement a control plane for the virtual CDN, a region container to implement a virtual CDN region and one or more end point containers to implement a virtual CDN local container;

wherein each virtualization container comprises a virtual network function with a plurality of virtual network function components; and wherein the CDN manager is arranged to control the instantiation and network coupling of the object definitions such that physical resources are deployed to effect the virtual CDN in response to the command.

9. The system of claim 8, wherein the control interface is arranged to receive communications from the NFV orchestrator indicating a state of the virtual CDN.

10. The system of claim 9, wherein, in response to receiving state data from the NFV orchestrator, the CDN manager is arranged to instruct the NFV orchestrator to modify the configuration of the virtual CDN.

11. The system of claim 8, wherein the definition data for the one or more endpoint
container defines a peer-to-peer configuration of instances of the end-point containers, said instances being able to exchange data to fulfil a request for content.

12. The system of claim 8, comprising:
the NFV orchestrator, wherein the NFV orchestrator is arranged to monitor a state of the virtual CDN and instruct modifications to the configuration of the virtual CDN in response to changes in the state.

13. A method comprising:
receiving a command indicative of an instructed modification of a virtual content delivery network (CDN);
accessing data defining an end-point virtualization container to implement a virtual CDN local container of the virtual
CDN, the end-point virtualization container being associated with definition data for a plurality of virtual network subcomponents;
instructing a network function virtualization (NFV) orchestrator to instantiate the end-point virtualization container, including:
determining a state of an instance of the virtual CDN, including determining a state of one or more instantiated virtual network subcomponents of the virtual CDN, said sub-components being associated with one of a control plane virtualization container to implement a control plane for the virtual CDN and a region virtualization container to implement a virtual CDN region;
instructing instantiation of the end-point virtualization container, including instructing instantiation of one or more of the plurality of virtual network subcomponents of the end-point virtualization container;
instructing network coupling of instances of the virtual network subcomponents of the end-point virtualization container to instances of the virtual network sub-components of the virtual CDN; and
receiving indication that physical resources have been configured to affect the modification of the virtual CDN.

14. The method of claim 13, wherein the command is generated based on a detected load condition associated with the virtual CDN.

15. The method of claim 13, wherein instructing network coupling comprises:
instructing network coupling of instances of the virtual network subcomponents of the end-point virtualization container to instances of virtual network sub-components of one or more other end-point virtualization containers within the virtual CDN such that content is exchangeable between the instances the end-point virtualization containers.

16. The system of claim 8, wherein the control plane container includes a logger component for maintaining a log of activity of a virtual component implementing the control plane container.

17. The system of claim 8, wherein the control plane container includes a domain name server component to implement a domain name server mapping domain names to virtual IP addresses across the control plane container.

18. The system of claim 17, wherein the region container includes a tracker component to monitor one of a bandwidth through the CDN, a virtual switching port of the CDN, and a change in a virtual network node of the CDN.

19. The system of claim 18, wherein at least one of the one or more end point containers includes a caching component having a cached copy of content accessible through the virtual CDN.

20. The system of claim 19, wherein at least one of the one or more end point containers includes a compression component for compressing or uncompressing cached content in the caching component.

* * * * *